Patented Mar. 31, 1936

2,035,458

UNITED STATES PATENT OFFICE 2,035,458

FLOTATION OF COPPER SULPHIDES WITH NICKEL ACTIVATORS

Frederic A. Brinker, Denver, Colo.

No Drawing. Application July 21, 1934,
Serial No. 736,348

12 Claims. (Cl. 209—167)

This invention relates to the froth flotation process for the recovery of minerals and has to do particularly with the separation of copper sulphides from other sulphides and from gangue.

On some ores it is difficult to recover the maximum amount of copper sulphide from the ore. This is particularly true for copper ores that contain zinc and/or iron sulphides to which a cyanide compound such as sodium cyanide has been added to inhibit the zinc and/or iron sulphides to permit the differential flotation of the copper sulphide either with or without lead sulphide.

I have discovered that water-soluble nickel compounds produce an activating condition for these copper sulphides, either where they are difficult to float from the nature of the ore itself, or where they are difficult to float as a result of a previous addition of a cyanide compound.

Where a cyanide compound has been added for the purpose of inhibiting zinc and/or iron sulphides, it will ordinarily have been for the purpose of recovering copper sulphide or both copper and lead sulphides. In this instance the cyanide will also inhibit most of the copper sulphides.

Where lead sulphide is present it may be separated from the copper, zinc or iron sulphides by a preliminary flotation, or the nickel compound may be added in the presence of the lead sulphide to reactivate the copper sulphides so that the lead and copper sulphides are recovered together.

The addition of a soluble nickel compound to produce an activating condition for floating copper sulphides may be made to either an alkaline or non-basic pulp, but better results are obtained in a non-basic pulp which preferably is neutral but may be slightly acid. Where the nickel compound is added to an ore to which cyanide is also added, it may be added at any stage of the process, that is prior to, subsequent to or at the same time as the addition of the cyanide. The nickel compound may be any soluble nickel compound, such as acetate, chloride, nitrate, sulphate, and all the other soluble or slightly soluble nickel salts, preference being given to those mentioned because of their low cost. Where cyanide is used it may be sodium cyanide, zinc cyanide or any other cyanide compound soluble or even slightly soluble as well known in the flotation art, to perform the function supposedly of forming a non-activating coating on certain sulphides such as iron and zinc sulphides.

The invention therefore may be stated as residing in the use of any soluble nickel compound as an activator for the froth flotation of copper sulphides, both for the purpose of activating them in their natural state where otherwise difficult to float and for the purpose of activating them where they have been inhibited by cyanide compounds as where such cyanide compounds have been employed to depress zinc or iron sulphides. The invention likewise includes the separation of copper sulphides from zinc and/or iron sulphides by employing a cyanide compound to depress the zinc and iron sulphides and a soluble nickel compound to activate the copper sulphides in the presence of the cyanide and permit froth flotation of the copper sulphides. The invention further includes such use of the cyanide and nickel compounds in ores containing both copper and lead sulphides along with zinc and/or iron sulphides both where the nickel compound is added to the cyanide solution after flotation of the lead sulphides, the copper sulphides being floated after the addition of the nickel compounds, and where the nickel compound is added before flotation of the lead sulphide so that the copper and lead sulphides are froth floated together, the zinc and/or iron sulphides being left in the tailings in each case.

To illustrate the application of the invention the following examples are given.

*Example 1.*—An ore containing 5% copper sulphide, 70% iron sulphide and the balance gangue, was ground with water and then introduced into a flotation machine with the addition of one pound per ton of nickel sulphate $$(NiSO_4.6H_2O)$$

and sufficient frothing and collecting agents (for example, cresylic acid and thiocarbanilid respectively) to produce a copper sulphide froth concentrate which was then removed by flotation and contained but little iron. Any other suitable frothing and collecting agents may be used as well understood in the art. If amyl xanthate be used and a concentrate low in iron be desired, some iron sulphide inhibitor such as sodium cyanide should be used.

*Example 2.*—An ore containing 15 to 20% combined lead, copper, zinc and iron sulphides with gangue, was ground in water and then introduced into the flotation machine with ¼ pound per ton of sodium cyanide added together with sufficient frothing and collecting agents to produce a lead sulphide froth concentrate. Upon froth flotation this concentrate contained most of the lead sulphide with a small amount of copper sulphide and very little zinc and iron sulphides. Here most of the copper sulphide was inhibited by the cyanide. After this froth concentrate was removed, one pound of nickel sulphate (NiSO$_4$.6H$_2$O) was added and sufficient frothing and collecting agents to produce a copper sulphide froth concentrate. Upon froth flotation substantially all the copper sulphide came over in the concentrate. The zinc and iron sulphides were rejected in the tailing. To recover the zinc sulphide from the tailing, this is next floated by the addition of any soluble copper compound, such as copper sulphate, and sufficient frothing and collecting agents.

Example 3.—An ore containing 15 to 20% combined lead, copper, zinc and iron sulphides contained in gangue, was ground in water and then introduced into the flotation machine with a ¼ of a pound per ton of sodium cyanide and one pound per ton of nickel sulphate (NiSO$_4$.6H$_2$O) and sufficient frothing and collecting agents to produce a lead-copper concentrate. In this case the addition of the nickel compound, together with the cyanide, reactivated the copper, or prevented the copper from being inhibited by the cyanide, while the iron and zinc were inhibited. The copper sulphide was then froth floated and the zinc and iron sulphides were rejected in the tailing. With this procedure also the zinc can be floated from the tailing as in Example 2, if desired. The lead sulphide of course came over with the copper sulphide.

Example 4.—In an ore containing copper sulphide and iron sulphide, where it is desired to make a sharp separation by the froth flotation process between the copper sulphides and the iron sulphides, the ore is ground with water to liberate the sulphides from each other and from the gangue present in the ore and a cyanide compound is added either to the grinding mill so as to be present during the grinding, or the cyanide compound is added to the ground ore pulp prior to the flotation operation. This cyanide compound is a well known inhibitor for iron sulphides but if sufficient cyanide is used to give the best results for the inhibiting of the iron sulphides, some copper sulphides are inhibited by the cyanide thereby resulting in a high tailing loss of copper sulphide. Therefore, prior to the flotation operation in which the copper sulphides are separated from the iron sulphides, a soluble nickel compound as above described is added to the ore pulp to reactivate the copper sulphides inhibited by the cyanide compound. This ore pulp is next subjected to the froth flotation treatment in which a flotation collector and frother are added and the copper sulphide removed as a froth copper concentrate, thereby making a sharp separation between the copper sulphide and the iron sulphide. After this separation the iron sulphide may be either rejected as tailing or floated by well known methods to make an iron froth concentrate.

Thus according to this invention the soluble or slightly soluble nickel compounds herein mentioned serve to reactivate copper sulphides where cyanide compounds have been added. In the manners hereinabove described nickel compounds therefore may be employed for ready separation of copper sulphide from iron and zinc sulphides, either with lead sulphides or separate therefrom.

I claim:

1. A froth flotation method for the recovery of copper sulphides from sulphide ores comprising preparing a pulp, supplying to the pulp a soluble nickel compound to activate the copper sulphides, introducing a frothing agent, and recovering the copper sulphide as a froth concentrate by the froth flotation method.

2. A method for the recovery of copper sulphides from ores containing iron and copper sulphides comprising preparing an ore pulp, supplying a soluble nickel compound to the pulp to activate the copper sulphides, supplying frothing and collecting agents to the pulp and recovering the copper sulphides as a concentrate by the froth flotation method.

3. A flotation method for recovering copper sulphides from sulphide ores containing iron sulphide, comprising producing an ore pulp, supplying a cyanide compound to the pulp to inhibit flotation of iron sulphide, supplying a soluble nickel compound to the pulp to activate the copper sulphides, introducing a frothing agent and a collecting agent to the pulp, and recovering the copper sulphides as a copper concentrate substantially free from iron sulphides by the froth flotation method.

4. A method according to claim 3 wherein the ore contains zinc sulphide which is inhibited by the cyanide compounds.

5. A method for the froth flotation separation of lead and copper sulphides from sulphide ores comprising preparing a pulp from the ore, supplying a cyanide compound to the pulp to inhibit the copper sulphides, introducing a frothing agent to the pulp, removing the lead sulphide as a froth concentrate by the froth flotation method, supplying a soluble nickel compound to the pulp to activate the copper sulphides, and recovering the copper sulphides from the pulp by the froth flotation method.

6. A method according to claim 5 wherein the ore contains sulphides of the class including iron and zinc sulphides, these being inhibited throughout by the cyanide compound.

7. A method according to claim 3 wherein the ore contains lead sulphides which are floated with the copper sulphides.

8. A method according to claim 3 wherein the ore contains zinc sulphide which is inhibited by the cyanide compound and lead sulphide which is floated with the copper sulphide.

9. A froth flotation method for the recovery of copper sulphides from sulphide ores comprising preparing an ore pulp containing non-activated copper sulphides, supplying to the pulp a nickel salt at least slightly soluble in the pulp, thereby activating said non-activated copper sulphides, introducing a frothing agent, and recovering the copper sulphide as a froth concentrate by the froth flotation method.

10. A method according to claim 9 wherein the ore pulp contains lead sulphides which are floated with the copper sulphides.

11. A froth flotation method for the separation of sulphides from ores containing copper sulphides and sulphides of the class iron sulphides and zinc sulphides, comprising preparing an ore pulp containing sulphides of the stated character, supplying an agent to depress iron and zinc sulphides present and whereby copper sulphides are also depressed, supplying to the pulp a soluble nickel salt to reactivate the depressed copper sulphides without reactivation of substantial quantities of iron and zinc sulphides present, introducing a frothing agent, and recovering the copper sulphides by the froth flotation method.

12. A method according to claim 11 wherein a cyanide is employed to depress the iron and zinc sulphides.

FREDERIC A. BRINKER.